United States Patent [19]

Guerini

[11] 4,188,648
[45] Feb. 12, 1980

[54] DATA SECURITY APPARATUS FOR MAGNETIC RECORDING DISC DRIVE

[75] Inventor: Albert J. Guerini, Gilroy, Calif.

[73] Assignee: Memorex Corporation, Santa Clara, Calif.

[21] Appl. No.: 939,844

[22] Filed: Sep. 5, 1978

[51] Int. Cl.² .............................................. G11B 5/54
[52] U.S. Cl. .................................... 360/105; 360/137
[58] Field of Search ........................... 360/103–105, 360/133, 135, 137; 206/444

[56] References Cited

U.S. PATENT DOCUMENTS

| | | | |
|---|---|---|---|
| 3,785,184 | 1/1974 | Wirth | 206/444 |
| 3,843,967 | 10/1974 | Mulvany | 360/133 X |
| 3,862,555 | 1/1975 | Wirth | 206/444 |

OTHER PUBLICATIONS

I.B.M./T.D.B. vol. 20, No. 10, Mar. 1978, pp. 4104-4105, "Removable media disc file" by Fugle et al.

Primary Examiner—John H. Wolff

[57] ABSTRACT

Apparatus for preventing unauthorized access to data recorded upon the magnetic discs of a disc drive which utilizes at least one rotating magnetic disc and at least one magnetic playback head movable relative to the axis of rotation of the disc to access data recorded on the disc includes structure selectively engageable and disengageable with the playback head for restraining the movement of the head, and locking structure for controlling the engagement and disengagement of the head movement restraining structure.

8 Claims, 4 Drawing Figures

U.S. Patent
Feb. 12, 1980
4,188,648
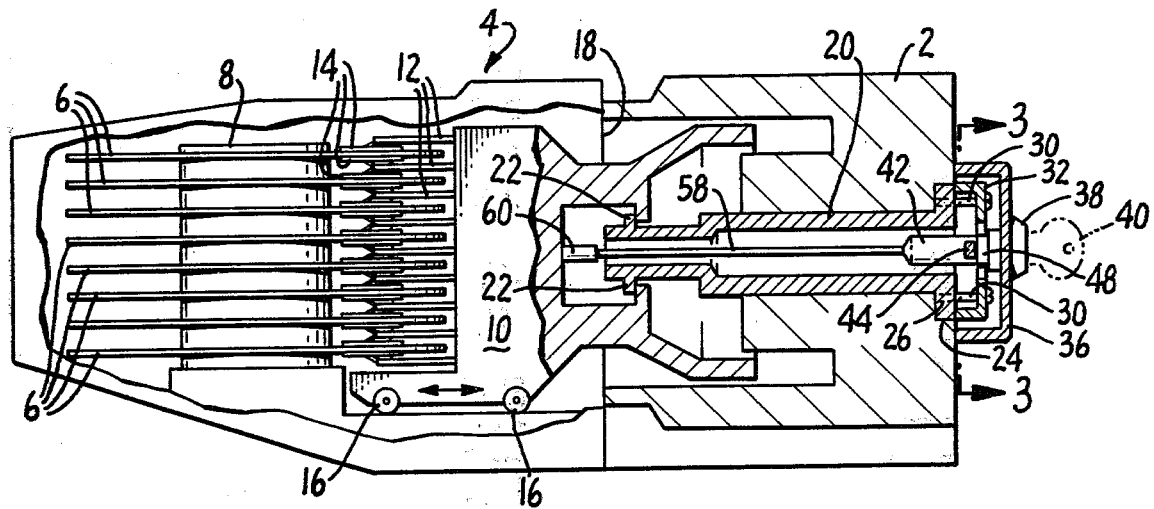
FIG. 1.
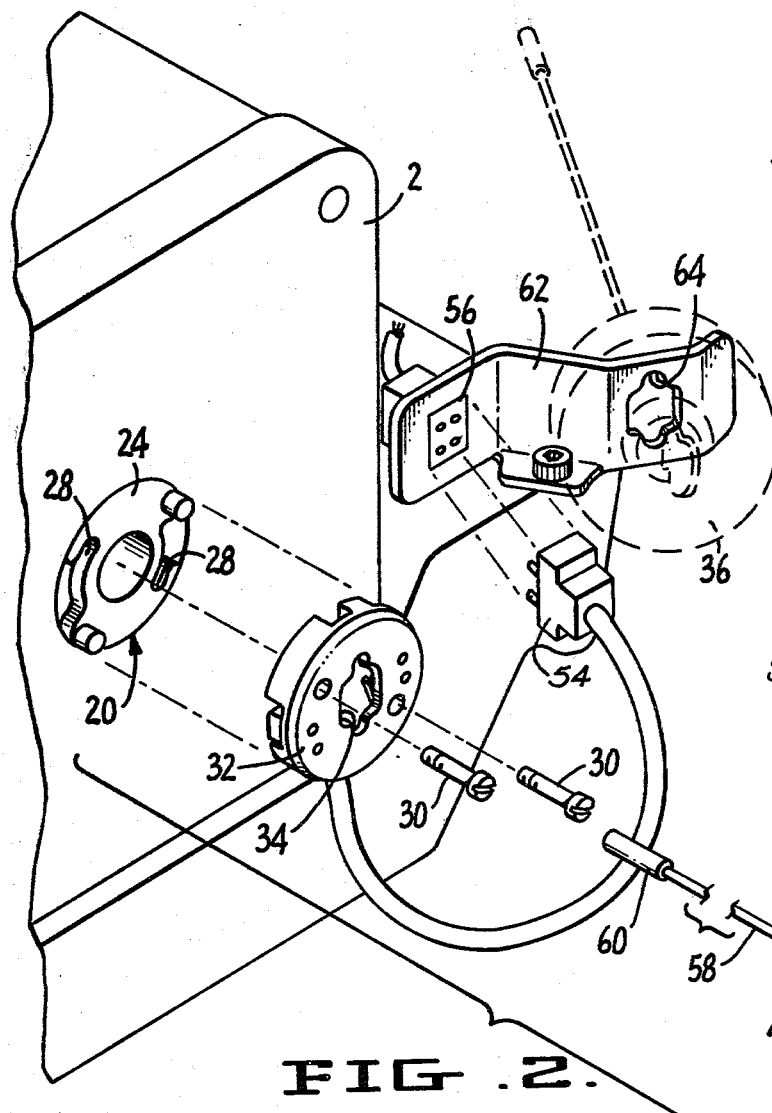
FIG. 2.
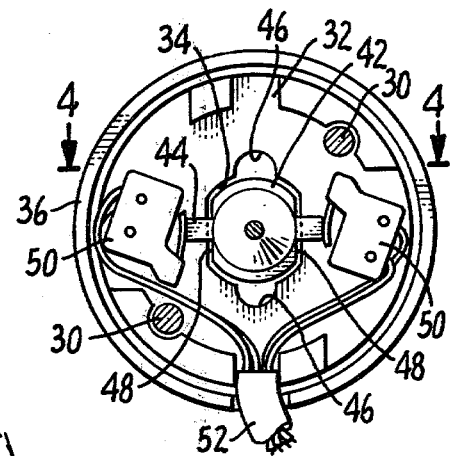
FIG. 3.
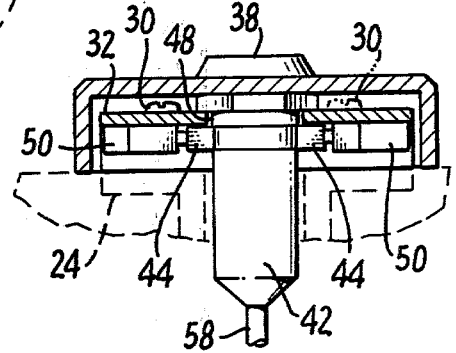
FIG. 4.
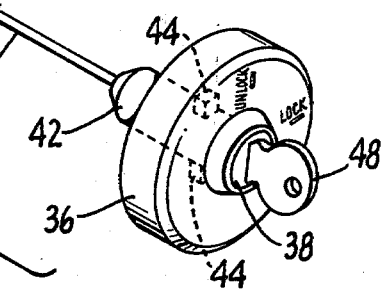

DATA SECURITY APPARATUS FOR MAGNETIC RECORDING DISC DRIVE

BACKGROUND OF THE INVENTION

1. Field of Invention

This invention relates to a direct access storage device in the form of a magnetic disc drive incorporating magnetic recording discs and movable recording and playback heads. This invention relates more particularly to apparatus for preventing unauthorized access to the data recorded upon such discs. While suitable for numerous types of such disc drives, this invention is particularly suited to disc drives in which at least one disc and one playback head are incorporated into an integral head/disc assembly.

2. Description of the Prior Art

In the past, direct access storage devices in the form of disc drives were designed and built in such a manner that the drive components and recording and playback heads formed an integral assembly, with the single recording disc or multiple disc packs being insertable into and removable from those drive structures. In those units sensitive data recorded upon the disc could easily be protected when not being used by simple removal of the disc or discs, conveniently in the form of an integral disc pack, from the drive, and then storage of those discs in a suitable security area or vault. This approach to security was reasonably satisfactory, although less than convenient in its requirement of removal of the recording discs.

The media removal technique of data security was still feasible, although less convenient, with the development of the "Winchester" technology in disc drives, as exemplified by the Memorex 3640 and IBM 3340 disc drives. These disc drives incorporated the recording and playback heads and the disc assemblies into a unitary data module which, although larger than a disc pack, was still readily removable and replaceable by an operator. Nonetheless, the increased size of the data modules pointed up the desirability of some data security arrangement which would not require removal of the module.

The problem of achieving data security became particularly acute with the next development in direct access storage device technology in which the discs and the heads are incorporated into an integral recording head/disc assembly (HDA) which is designed and configured for substantially permanent installation within the disc drive package, such that an operator could not readily remove the head/disc assembly (HDA). This arrangement is being used on equipment such as the Memorex 3650 and IBM 3350 storage devices. While performance of the storage device was improved by the enhanced alignment capabilities of the less readily removable or nonremovable HDA, such nonremovability made access to the data easier and precluded the use of a vault or other form of secured storage for data security. This problem is substantial, since the data stored in the HDA might be read out surreptitiously and since the HDA, while not readily removable by an operator, can be removed by a skilled technician. Thus, while the recording media (discs) were not readily removable, the HDA was capable of being used or removed, such that unauthorized removal or electronic access to the data might be obtained.

SUMMARY OF THE INVENTION

In view of the security problems associated with direct access storage devices, it is an object of this invention to provide an apparatus which will prevent unauthorized access to the data recorded on a recording disc or discs. It is a further object of this invention to provide such apparatus which may satisfactorily be incorporated into different types of disc drives, including those which incorporate an integral playback head/disc assembly.

These and other objects of the invention are provided by apparatus which includes means selectively engageable and disengageable with the magnetic playback head for restraining the necessary accessing movement of the head when engaged, and locking means for controlling the engagement and disengagement of the head movement restraining means such that the head movement restraining means can be disengaged only when the locking means is in an unlocked configuration. By this arrangement, control of the locking means serves to control access to the recorded data by controlling the movement of the playback head such as is necessary to access the data recorded on the disc.

BRIEF DESCRIPTION OF THE DRAWINGS

A particularly preferred embodiment of the apparatus of this invention will be described in detail below with respect to the enclosed illustrations, in which:

FIG. 1 is a side sectional view of portion of a disc drive incorporating the apparatus of this invention;

FIG. 2 is an exploded perspective view of the basic components of this invention as they apply to a disc drive;

FIG. 3 is a sectional view of the apparatus of FIG. 1 taken along line 3—3; and

FIG. 4 is a side sectional view of the apparatus of FIG. 3, taken along line 4—4.

DESCRIPTION OF A PREFERRED EMBODIMENT

While the data security apparatus of this invention may advantageously be installed on various types of magnetic disc drives, including those in which the disc media alone are removable and the recording and playback heads are integral with the drive and other types incorporating the "Winchester" technology in which a data module is removable by an operator, it may most advantageously be utilized with equipment such as the Memorex 3650 or IBM 3350 type of equipment in which the head/disc assembly is intended for removal from the disc drive only by a skilled technician. Accordingly, for purposes of illustration only, the preferred embodiment of this invention will be described in conjunction with a disc drive such as the Memorex 3650.

The principal components of this preferred embodiment of the invention are shown most clearly in the side sectional view of FIG. 1 and the exploded perspective view of FIG. 2. In both of these views, only the voice coil motor 2 of the disc drive is illustrated. It is to be understood that the voice coil motor 2 is an integral part of the disc drive and that the remaining portions of the disc drive have been omitted from these views for clarity of illustration. Thus, the voice coil motor 2 is to be considered only as a portion of and representative of the complete disc drive itself.

Mated to the voice coil motor 2 and attached by conventional means, such as cap screws, is the head/- disc assembly generally indicated by reference numeral 4 in FIG. 1. This head/disc assembly (HDA) includes one or more magnetic recording discs 6 mounted to a spindle 8 for rotation about an axis central to that spindle. Additionally, a carriage 10 within the HDA 4 supports one or more, in this case a plurality of, head support arms 12, each of which carries one or more recording and playback heads 14. It is to be understood that the heads 14 may either comprise combination recording/playback heads or separate heads for recording and playback of data. This carriage is supported on suitable means, such as rollers 16 appropriately guided, for reciprocal motion radially inwardly and outwardly of the discs 6, as indicated by the arrow in FIG. 1. The appropriate electrical connections between the recording heads and the remainder of the disc drive have been omitted, but are well known in the art.

As best shown in FIG. 1, a portion of the carriage 10 extends through an outer wall 18 of the HDA 4, which is suitably provided with conventional dust sealing means between the wall and the carriage 10, for the desired reciprocal actuation by the voice coil motor 2. It is this voice coil motor 2 that provides for the movement of the carriage 10 and heads 14 relative to the axis of rotation of the discs which is necessary to access data recorded on the discs.

When the particular type of disc drive illustrated in this preferred embodiment is shut down when its use is not desired, the carriage 10 is moved to its left-most position in FIG. 1, positioning the heads 14 over predetermined portions of the disc 6. In this preferred embodiment, the heads 14, which normally "fly" on a film of air of minute thickness carried by the spinning disc, come to rest against those discs when rotation is stopped. Since contact between the heads and the discs could create errors in data recorded on those portions, customarily those predetermined portions of the discs subjacent the heads at their radially innermost position of travel customarily have no data recorded thereupon but are used solely for providing areas for "landing" of the heads.

To avoid potential damage during a possible uncontrolled movement of the carriage 10 toward either the left or the right extremities of its travel, a "crash stop" 20, such as is well known in the art, is provided to decelerate and stop movement of the carriage 10 at either extreme of its travel. In this preferred embodiment the crash stop 20 may be a generally tubular structure inserted from the exterior of the voice coil motor 2 through an aperture therein into and engaging a portion of the carriage 10, with the ears 22 of a bayonet mount, which is insertable into the carriage 10 and brought into operative relationship therewith by a quarter turn about an axis extending longitudinally of the crash stop 20. In this embodiment an enlarged outer flange 24 on the crash stop 20 is received into a recess 26 on the outwardly facing surface of the voice coil motor 2. This flange 24 suitably may be provided with a pair of arcuate slots 28 which receive fasteners 30 for retaining the crash stop in place. These arcuate slots 28 suitably may be configured to permit insertion of the crash stop 20 into the voice coil motor 2 and the HDA 4 with the fasteners 30 already loosely in place, then permitting the carriage-engaging quarter turn of the crash stop 20 with those fasteners 30 still in place. In this carriage-engaging position the fasteners 30 may then be tightened to retain the crash stop 20 in place. Since the crash stop 20 engages and limits travel of the carriage 10 of the HDA 4, it is obvious that this crash stop 20 must be removed to permit any removal of the HDA from the disc drive.

Over the outer surface of the flange 24 of crash stop 20 is mounted locking plate 32, suitably fastened to the disc drive by the same fasteners 30 which retain the crash stop 20. In the center of locking plate 32 is provided an aperture 34 for purposes to be described below.

Completely covering the outer portions of locking plate 32, and thus crash stop 20, is cover plate 36, suitably formed of aluminum or other metal. In the center of the cover plate 36 is provided a lock 38 actuated by key 40. The rotatable tumbler of this lock 38 is itself attached to a member 42 extending away from the cuplike inner surface of the cover plate 36. Projecting radially outwardly from the rotatable member 24 are a pair of locking tabs 44 which, when in a vertical orientation, are insertable through the cutouts 46 of the locking plate aperture 34. From FIGS. 2 and 3 it may be seen that this aperture 34 is formed with flat sides which are closely spaced from flats 48 on the side of the fixed portion of the lock 38 which extends beyond the inward surface of cover plate 36. The mating flat surfaces on the lock 38 and the locking plate 32 thus prevent the cover plate 32 from rotating when the member 42 is inserted fully through the aperture 34.

When the lock 38 is in its unlocked configuration, the locking tabs 44 will extend in a generally vertical direction parallel to the flats 48 on the lock 38, s that the tabs are insertable through the cutouts 46. Then, with the member 42 inserted through the aperture 34 and locking plate 32, the key 40 may rotate the lock 38 tumbler and thus the member 42, relative to the cover plate 36, to a position in which the locking tabs 44 suitably are generally normal to the flats 48. In this locked configuration the flats 48 prevent rotation of the lock and thus of the cover plate 36 to which the lock 38 is rigidly attached, and the interference between the locking tabs 44 and the locking plate 32 prevents any withdrawal of the member 42 and thus any removal of the cover plate 36.

Rotating the locking tabs 44 to the locked configuration also serves to operate one or more microswitches 50. These microswitches 50 suitably may be normally closed and provide, when closed, the necessary continuity for application of electrical power to the disc drive. The switches 50 may be connected through suitable wiring 52, plug 54 and socket 56 to the electrical power controls for the disc drives. For security, this wiring 52 and the plug 54 and socket 56 may be mounted internally of the disc drive if desired. These normally closed switches 50 may permit application of electrical power to the disc drive at any time that the switches are not actuated and their circuits opened by locking insertion of the member 42 and thus engagement between the switches and locking tabs 44. Whenever the switches are so actuated by such engagement with the locking tabs 44, the application of electrical power to the disc drive may be prevented.

Extending longitudinally from the member 42 and along its axis of rotation is plunger 58, suitably in the form of a metal rod, the longitudinally outermost extremity of which suitably is covered by a plastic cap 60. This plunger 58, attached to the member 42 and thus to the lockable cover plate 36, is dimensioned to extend through an aperture in the crash stop 20 and bear against a portion of the carriage 10 of the HDA 4. The length of this plunger 58, with its plastic cap 60, suitably is such as to force the carriage 10 to its extreme leftmost position in FIG. 1, thus restraining any movement of the carriage 10 and the magnetic heads 14. Further, by maintaining the carriage in its left-most position, the heads will be held in their rest position which is radially innermost with respect to the discs 6, and thus positioned over areas where no data is recorded on those discs.

From the foregoing description it may thus be seen that the apparatus of this invention provides lockable structure for restraining the movement of the magnetic playback heads and maintaining them and their supporting carriage in a predetermined position relative to the axis of rotation of the recording discs. With this apparatus the recording heads are prevented from moving to different data storage locations on the discs, and the locking structure further provides for prevention of application of electrical power to operate the disc drive. Since the fasteners 30 are located so as to be covered by the cover plate 36 when in its installed and locked position, access to those fasteners 30 is thus blocked and removal of the crash stop 20 is prevented when that cover plate 36 is locked in position. Since the crash stop 20 must be removed as a preliminary step to any removal of the HDA 4, this locking arrangement provides means for preventing unauthorized removal of the HDA. Thus, unauthorized removal of the HDA is prevented and both mechanical and electrical means are provided for preventing unauthorized access to the data recorded on the discs.

As a convenience, a bracket 62 having an aperture 64 corresponding to the aperture 34 of the locking plate 32 may be attached to the disc drive to provide a convenient storage position for holding the cover plate 36 with its lock and plunger structures when they are withdrawn from insertion into the voice coil motor 2, such as when the disc drive is to be utilized. With the cover and its associated components stored in this bracket 62, it is conveniently available for installation into the voice coil motor to secure the data at any desired time by simple operation of the key 48.

While this invention has been described in detail with respect to an embodiment particularly suited for disc drives of the nature of a Memorex 3650, it is to be recognized that the principles of this invention are readily applicable to numerous other types of disc drives, which incorporate not only the described substantially permanently installed HDA but also operator-removable data modules and also those types of disc drives incorporating heads integral to the disc drive and removable disc packs. The variations and modifications to the above-described structure necessary to render the present invention suitable for use on those other types of disc drives, along with numerous other variations and modifications, will be readily apparent to those skilled in the art. Accordingly, the foregoing detailed description is to be considered illustrative only of the principles of the invention and is not to be limitative thereof, the scope of the invention being limited solely by the claims appended hereto.

What is claimed is:

1. Apparatus for preventing unauthorized access to data recorded upon the magnetic discs of a disc drive which utilizes at least one rotating magnetic disc and at least one magnetic playback head movable relative to the axis of rotation of the disc to access data recorded on the disc and a motor for moving the head relative to the disc axis, comprising means selectively engageable and disengageable with said playback head for restraining, when engaged, the movement of said head, said head movement restraining means providing for restraint of said head movement independent of the operation of said head moving motor, and locking means for controlling the engagement and disengagement of said head movement restraining means such that said head movement restraining means can be disengaged only when said locking means is in an unlocked configuration, whereby control of the locking means serves to control access to the recorded data by controlling the movement of the playback head necessary to access the data.

2. The apparatus of claim 1 further comprising switch means controlled by said locking means for controlling the application of electrical power to said disc drive for operation of said drive, whereby the locking means may serve to prevent application to the disc drive of the electrical power necessary for operation of the drive when the locking means is in its locked condition.

3. The apparatus of claim 1 wherein said head movement restraining means maintains said recording head in a position overlying portions of said discs upon which is recorded no data, whereby no data can be read by the head while the restraining means is attached to the disc drive.

4. The apparatus of claim 1 wherein said head movement restraining means further comprises means for preventing, when engaged, the removal of said recording disc from said disc drive, whereby the head movement restraining means must be disengaged to remove the recording disc.

5. The apparatus of claim 4 wherein said disc drive includes a removably attached recording head crash stop which must be removed to permit removal of said recording disc, and wherein said apparatus further comprises means for preventing, when engaged, the removal of said crash stop.

6. The apparatus of claim 5 wherein said recording disc and said playback head comprise an integral head/disc assembly which is attachable to and removable from said disc drive as a unit, and wherein said crash stop projects inwardly of said head/disc assembly, and wherein said crash stop removal preventing means comprises a cover removably attached to said disc drive under the control of said locking means and substantially covering the attachment of said crash stop to said disc drive.

7. The apparatus of claim 5 wherein said head movement restraining means comprises plunger means extending through an aperture in said crash stop and bearing against a portion of a carriage supporting said recording head.

8. Apparatus for preventing unauthorized removal of magnetic recording discs and unauthorized access to data recorded upon the magnetic discs of a disc drive in which the playback heads, attached to a movable carriage, and recording discs comprise an integral head/disc assembly which is attachable to and removable from the disc drive as a unit, and which disc drive includes a recording head crash stop which is removably attached to the disc drive and which must be removed to permit removal of the head/disc assembly, comprising cover means removably attached to said disc drive and covering the attachment of said crash stop to said disc drive, plunger means attached to said cover means and projecting inwardly of said head/disc assembly and bearing against the movable carriage supporting said playback heads and maintaining said carriage in a predetermined position relative to the axis of rotation of said recording discs, whereby the recording heads are prevented from moving to different data storage locations on the discs, locking means operatively connected with said cover means for controlling the removal of said cover means and said plunger means from said disc drive such that said cover means and said plunger means can be removed only when said locking means is in an unlocked condition, and switch means controlled by said locking means for controlling the application of electrical power to said disc drive for operation of said disc drive, whereby the locking means serve to control removal of the head/disc assembly and operation of the disc drive to obtain access to the data recorded on the disc.

* * * * *